United States Patent [19]
Tonkin et al.

[11] Patent Number: 5,828,319
[45] Date of Patent: Oct. 27, 1998

[54] MOTOR VEHICLE DISPLAY SYSTEM AND RANGING DEVICE

[75] Inventors: Mark Christopher Tonkin, Lewes; Simon Lewis Marshall Hall, Worthing; Gareth Anthony Strong, Shoreham by Sea; Marco Cucinotta, Worthing, all of Great Britain

[73] Assignee: Design Technology & Innovation Limited, Lewes, United Kingdom

[21] Appl. No.: 284,540
[22] PCT Filed: Feb. 5, 1993
[86] PCT No.: PCT/GB93/00251
§ 371 Date: Aug. 5, 1994
§ 102(e) Date: Aug. 5, 1994
[87] PCT Pub. No.: WO93/15931
PCT Pub. Date: Aug. 19, 1993

[30] Foreign Application Priority Data

Feb. 5, 1992 [GB] United Kingdom ................... 9202472

[51] Int. Cl.⁶ ..................................................... B60Q 1/00
[52] U.S. Cl. ........................... 340/903; 340/464; 340/466; 340/467; 340/479
[58] Field of Search .................................... 340/467, 902, 340/464, 463, 466, 479, 903

[56] References Cited

U.S. PATENT DOCUMENTS

| | | | |
|---|---|---|---|
| 3,846,749 | 11/1974 | Curry | 340/467 |
| 4,258,353 | 3/1981 | Carlson | 340/467 |
| 4,556,862 | 12/1985 | Meinershagen | 340/479 |
| 4,600,913 | 7/1986 | Gaine | 340/479 |
| 4,663,609 | 5/1987 | Rosario | 340/479 |
| 4,894,641 | 1/1990 | Yang | 340/466 |
| 4,987,405 | 1/1991 | Jakohowski | 340/479 |
| 5,017,904 | 5/1991 | Browne et al. | 340/467 |
| 5,089,805 | 2/1992 | Salsman | 340/479 |
| 5,148,147 | 9/1992 | Kobres | 340/479 |
| 5,150,098 | 9/1992 | Rakow | 340/479 |
| 5,162,794 | 11/1992 | Seith | 340/903 |
| 5,164,701 | 11/1992 | Nan-Mu et al. | 340/467 |

Primary Examiner—Jeffery A. Hofsass
Assistant Examiner—Edward Lefkowitz
Attorney, Agent, or Firm—Sumner C. Rosenberg

[57] ABSTRACT

A vehicle display system has a stationary detector and an indicator, which form a stationary vehicle detection apparatus being operative to produce an indicator signal which is indicative of the vehicle being stationary. The vehicle display system also has a vehicle deceleration detector and an indicator. The vehicle deceleration detector measures the magnitude of deceleration of a vehicle and generates a signal to drive the indicator and thereby generate a display indicative of the magnitude of vehicle deceleration. The vehicle deceleration detector is independent of the vehicle braking system. In one embodiment, the indicator is an array of lamps and the stationary vehicle indicator signal is an inanimate display. One embodiment has an additional ranging device that detects a trailing vehicle within a predetermined distance of the vehicle employing the ranging device. The ranging device may be used to initiate a change of the display generated by the vehicle display system.

16 Claims, 9 Drawing Sheets

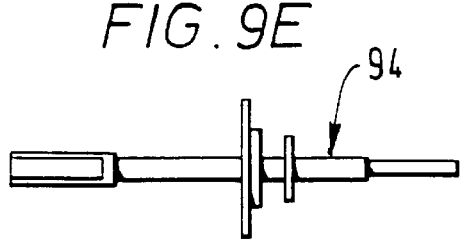
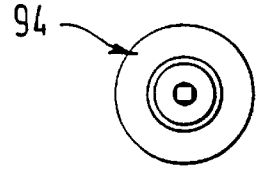
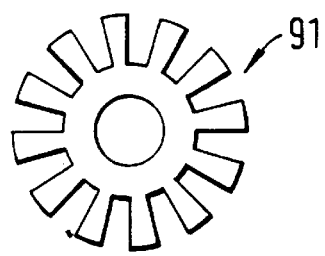
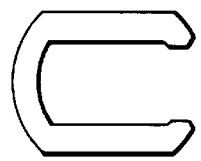
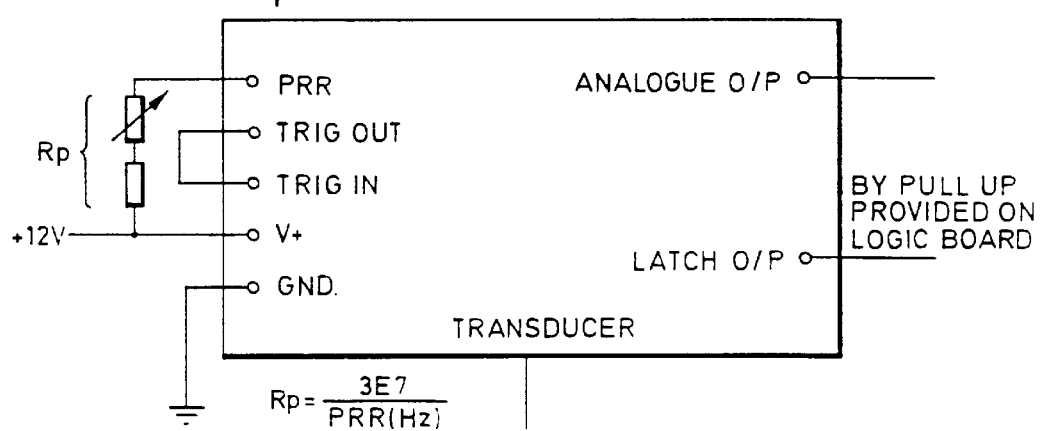

MOTOR VEHICLE DISPLAY SYSTEM AND RANGING DEVICE

BACKGROUND OF THE INVENTION

1. Field of the Invention

This invention relates to a display system for a motor vehicle. The display system according to the invention enables an observer to gain some appreciation of the magnitude of the deceleration of an observed motor vehicle, for example, from a following motor vehicle and to be informed if that observed motor vehicle is stationary or moving.

2. Description of the Prior Art

Known vehicle display systems include a system which indicates the severity of vehicle braking. One such system is disclosed in Road Research Laboratory Report LR287 issued by the UK Ministry of Transport. Report LR287 discloses a system comprising a multiple brakelight visual display. The number of brake indicator lights which are illuminated in a display is dependent upon the magnitude of deceleration of the vehicle. Report LR287 also refers to a throttle-operated brakelight which is activated to indicate a low level of vehicle deceleration.

SUMMARY OF THE INVENTION

According to one aspect of the present invention there is provided a motor vehicle display system which preferably comprises vehicle deceleration detection means and an indicator in which the vehicle deceleration detection means operatively communicates with the indicator to generate a predetermined signal independently of the braking system of the vehicle so that said indicator presents a visual display indicative of the magnitude of deceleration of the vehicle. According to a feature of this aspect of the invention the deceleration detection means may comprise a piezo-resistive seismic accelerometer, or a vehicle velocity measuring and timing reference device which device calculates vehicle deceleration. With respect to the latter device this may comprise a part of a vehicle's anti-lock braking system.

Another aspect of the invention provides a motor vehicle display system which preferably comprises vehicle motion detection means and an indicator which vehicle motion means operatively communicate with said indicator to generate a predetermined signal so that said indicator presents a visual display indicative of the vehicle being stationary. In a preferred form both this stationary indicator and the progressive brake warning system are provided in the same display system. The predetermined signal generated by the indicator may be a random signal.

According to a feature of this aspect of the invention the vehicle motion detection means may comprise a vehicle velocity measuring device such as an opto-sensor associated with the vehicle speedometer. Alternatively it is possible to utilize information relating to the velocity of the vehicle generated by an anti-lock braking system as source data for the vehicle traction detection means.

According to another feature of this aspect of the invention the indicator may comprise an array of lamps which are illuminated and extinguished in a time dependent manner to indicate that the vehicle is stationary. This animate display may be a predetermined sequence of activating and deactivating the lamps or it may be random; if the sequence is predetermined, it may be cyclic. The stationary vehicle display can be deactivated after vehicle traction begins. Preferably the display may remain observable while the vehicle engine is running and the vehicle is stationary until a second vehicle is detected as being a predetermined distance behind the first vehicle using a vehicle distance measuring device. This feature will avoid annoying following drivers in slow moving and stationary traffic.

Another aspect of the invention provides a vehicle proximity detector which preferably comprises a transducer and a control module wherein said transducer is operative to produce an output signal and to receive an input signal.

The time delay between the output and input signals being indicative of the distance between the transducer and an object, such as a following vehicle, and wherein said control module is operative to drive said transducer and to provide a module output signal dependent on the time delay between transducer output and input signals.

In a preferred form a vehicle display system comprises all previous aspects of the invention. The vehicle display system having a vehicle deceleration detection means, a vehicle motion detection means, an indicator and a vehicle proximity detector all of which are operatively interconnected to produce an indicator signal indicative of the magnitude of deceleration of the vehicle and whether the vehicle is stationary. The vehicle proximity detector operating to alter the indicator signal and thereby minimise any annoyance effect caused by the indicator signal on observers in nearby vehicles.

BRIEF DESCRIPTION OF THE DRAWINGS

The invention will now be described, by way of example only, with reference to the accompanying drawings, in which:

FIG. 10 shows details of the electrical connectors part of the proximity sensor shown in FIGS. 3 and 4;

DESCRIPTION OF THE PREFERRED EMBODIMENTS

Figure 1:
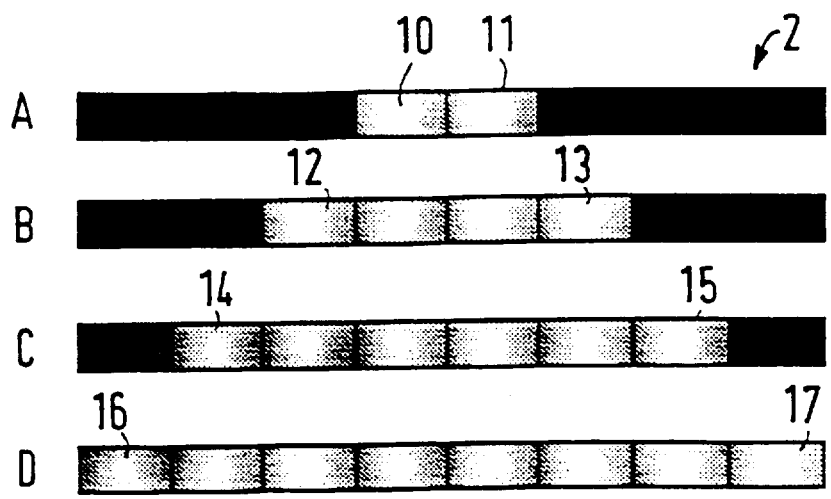
FIG. 1 shows four schematic representations A to D of a display according to the invention.

In a preferred embodiment a motor vehicle display system 1 according to the invention comprises an array 2 of eight lights 10 to 17 which normally would be displayed as red lights in a horizontal array. FIGS. 1A to D show a progressive increase in the number of lights which are illuminated dependent upon the magnitude of deceleration of the vehicle. The lights are represented as 'on' in the drawings by light shading, compared to 'off' which is indicated by a black rectangle. FIG. 1A shows central lights 10 and 11 whilst FIG. 1D shows all eight lights 10 to 17 illuminated.

The display may comprise a different number of lamps, for example, lights 10 and 11 might preferably be replaced by a single unit. The display would then comprise seven lights but it would of course also be possible to have say nine or eleven lights. Whilst rectangular lights are shown here it is also possible to have lights of different shapes. The lights may be of different colours, though red or amber lights are preferred.

The array of lights 2 can be carried at the rear of a vehicle such as in the standard high level brake light position in the rear window of a motor car, for example. The lights face rearwardly and are located so that they are readily visible to an observer, e.g. the driver of a motor vehicle travelling or positioned behind the motor vehicle in which the lighting display is mounted. The lights 10 to 17 are lit in pairs from the centre pair 10 and 11 out to outer pair 16 and 17 during a progressive brake warning (PBW) display. As the vehicle slows the deceleration is indicated by the number of lights which are lit. Gentle deceleration causes the illumination of lights 10 and 11, whilst slightly harder braking and therefore greater deceleration causes lights 12 and 13 to be illuminated in addition to lights 10 and 11 as shown in FIG. 1B. Firm retardation of the vehicle caused for example by firm depression of a brake pedal is detected by the vehicle display system 1 and causes further lights to be actuated. Thus lights 14 and 15 are illuminated in addition to lights 10 to 13 to indicate relatively large deceleration of the vehicle as shown in FIG. 1C. In order to show a more rapid reduction in vehicle velocity all eight lights are illuminated including outer pair 16 and 17 as shown in FIG. 1D.

Other ways of indicating progressive deceleration might be to vary the relative sizes of pairs of lights, for example, increasing the size of lights 12 and 13 compared to inner pair 10 and 11 and so on, so that outer pair 16 and 17 are the largest. This is found to enhance the apparent 'growth' effect of the display thereby emphasising the more rapid deceleration of the vehicle and its increasing proximity to trailing vehicles. Alternatively, each pair of lights might be a different colour, shade or intensity to other pairs of lights. For example, different tones of amber might be used starting from a light shade for inner pair 10 and 11 and darkening towards outer pair 16 and 17, or possibly outer pair 16 and 17 might be red. A further method would be to change the relative intensity of the pairs of lights so that outer pair 16 and 17 might be brighter than inner pair 10 and 11. A combination of these parameters might be used in a PEW display and also a vehicle stationary indicator to be described.

The lights themselves might comprise electroluminescent bulbs which radiate light through translucent, coloured filters. Alternatively, reflective lights might be used having phosphorescent targets: this can reduce the effect of dazzle of the display. Other forms of light source are envisaged such as light emitting diodes, for example. The display may also comprise a control which enables the intensity of the overall display to be varied, for example, enabling adjustment from a bright day setting to a night setting.

The operation of the light sequence indicative of deceleration can be independent of the braking system of the vehicle and dependent principally on the absolute vehicle deceleration, except that it is possible to illuminate lights 10 and 11 when the vehicle brake pedal is depressed independent of the actual deceleration caused. In this way the initial indication from the light display is similar to the known brake light displays such as a high mounted single centre brake light presently in use on some motor vehicles. In a preferred form however, the initial deceleration is independent of both the vehicle accelerator or brake controls. This might not always be possible since certain national laws may require that the first lights are illuminated only when the brake pedal is depressed.

An advantage of a display system according to the present invention is that it can be mounted in a vehicle during manufacture, or alternatively, at a later time by making minor modifications to a vehicle, so that a retrofit unit or kit could be made available for the 'after sales' market. This is possible since deceleration can be detected by an accelerometer (described later) which is independent of any existing vehicle components.

The display system can be used to generate a display indicative of a vehicle having come to rest. This particular arrangement is termed a vehicle stationary indicator (VSI). The display may be animate or static. An animate visual display sequence is shown schematically in FIG. 2A to D, by way of example. In this case, six of the eight lights in array 2 are lit a all times and pairs of lights are deactivated sequentially. Thus, in FIG. 2A lights 10 and 11 are deactivated whilst lights 12 to 17 are illuminated, and in FIG. 2B lights 12 and 13 are deactivated whilst the rest of the display is illuminated. FIGS. 2C and D show lights 14 and 15 deactivated and 16 and 17 deactivated respectively whilst the rest are lit. This sequence can be operated cyclically whilst the vehicle is stationary, for example, having a repeat period of about 1 second. The dynamic, animate effect is useful in catching the attention of drivers in following vehicles. The effect of the animate display is such that it is intended to indicate that the associated vehicle is stationary and not just braking, this fact should be apparent from the display and/or sequence and consequently a number of different sequences could be used.

The animate sequence of the vehicle stationary indicator can be disabled when a following vehicle is less than a certain distance behind the vehicle carrying the display system 1. This has the beneficial effect of avoiding annoyance or mesmerisation of occupants of following vehicles, for example, when in heavy traffic or when stopped at traffic control lights. An indication that the vehicle is stationary can still be effected by maintaining the outer pair of lights 16 and 17 in a continuously lit mode as shown in FIG. 2E. This in itself has a further benefit of avoiding misinterpretation by the driver of a following vehicle that the vehicle ahead is about to accelerate away. Alternatively the intensity of illumination of lights 10 to 17 can be reduced when a following vehicle is a predetermined distance behind. This has the advantage of maintaining the same display whilst the vehicle is stationary, thereby avoiding any confusion of the driver of a following vehicle. The lights 10 to 17 may be dimmed simply by dividing the voltage across the lamps when a proximity sensor, described later, gives a signal indicative of a nearby trailing vehicle. It is apparent that the 'vehicle stationary indicator' display should be terminated when the vehicle starts to move off thus it is appropriate for the display system 1 to comprise a vehicle motion detector (described in detail later) which operates to detect whether the vehicle is moving.

In another embodiment the animate display may change to an even intensity, static display when a trailing vehicle is detected by the proximity sensor. The static display might be a linear array of amber triangular lights for example. In a further form the display only provides a static VSI signal and comprises lights of a preset intensity which is sufficiently low not to dazzle drivers in trailing vehicles. In this latter form a proximity sensor may be omitted thereby reducing the cost of the overall display system. In another form the VSI signal might be generated by the same lights used for the PBW signal, where in this latter case the lights are red rectangles, for example, and in the former case the lights change to amber triangles, for example, when the vehicle stops.

Figure 2:
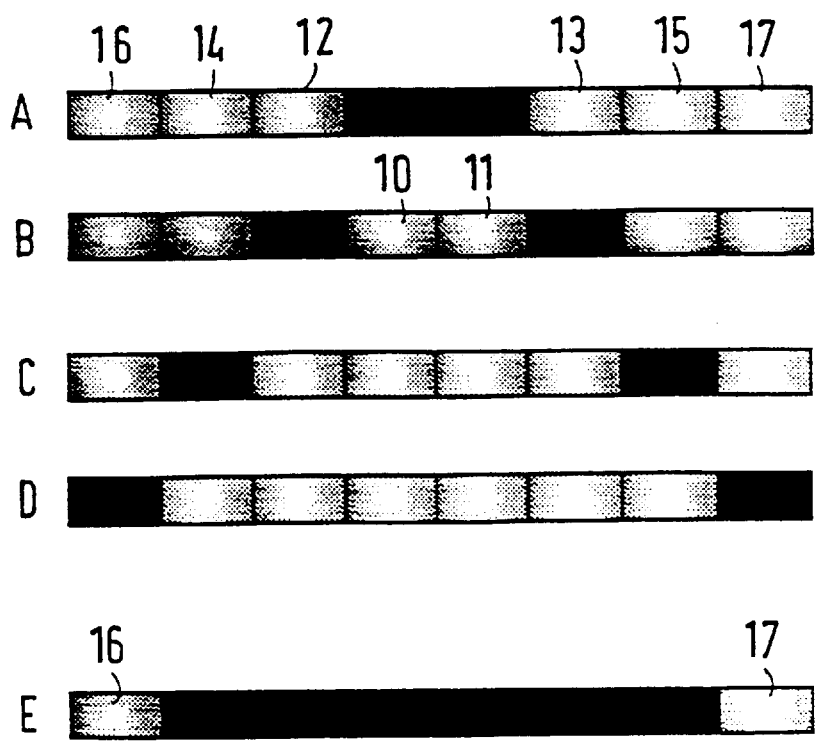
FIG. 2 shows five schematic representations A to E of the display shown in FIG. 1 used to indicate that a vehicle is stationary.
Figure 3:
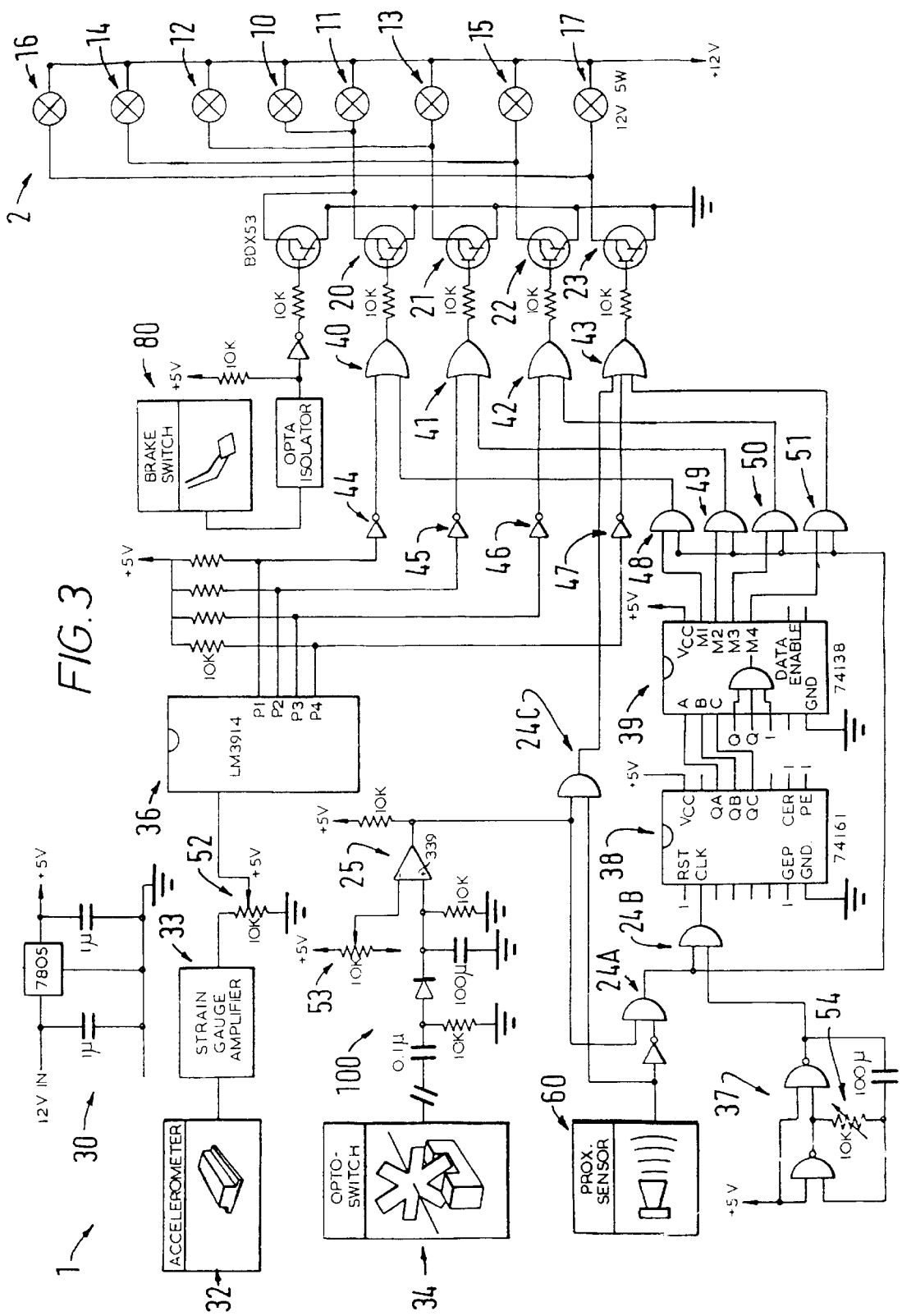
FIG. 3 is a schematic electronic circuit diagram of a display system according to the invention which generates the display sequences shown in FIGS. 1 to 2.
Figure 4:
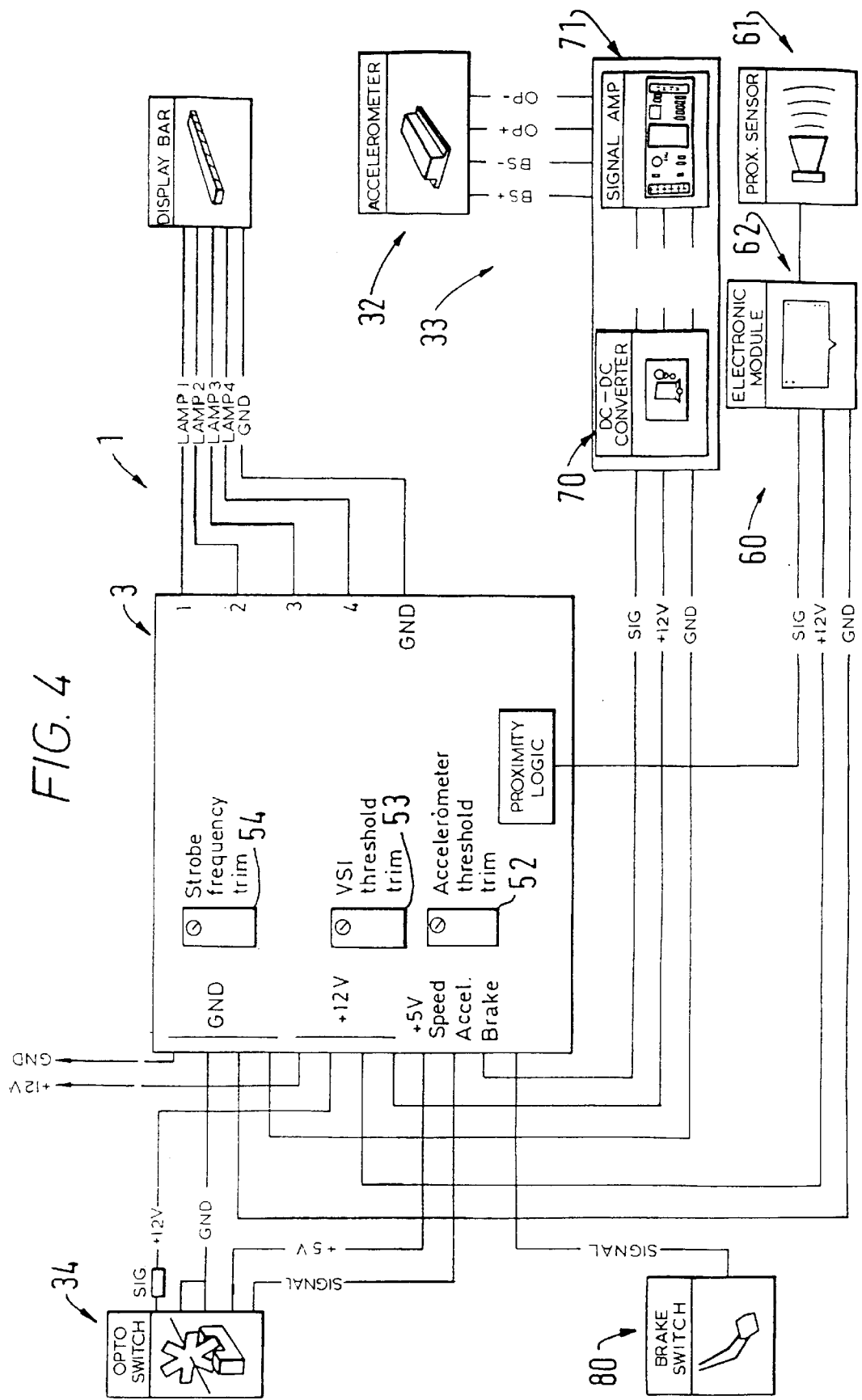
FIG. 4 is a schematic block diagram showing further wiring detail of the system shown in FIG. 3.

Electronic circuitry used to control the light display is shown in FIGS. 3 and 4. The circuit diagram is schematic but can be seen to generate a logic sequence dependent on various inputs, which actuates the light display shown in FIGS. 1 and 2.

The vehicle display system 1 shown comprises the array 2 of eight lights 10 to 17 which are 12V 5 W (or 21 W) lamps for example. The traditional red brake light is generated in the usual way by using a translucent red filter. Pairs of lights 10 and 11, 12 and 13, 14 and 15, and 16 and 17 are connected to power transistors 20, 21, 22 and 23 respectively. Each lamp is connected to a +12V DC supply and is illuminated when the relevant power transistor is opened to earth. Since the lamps are connected in pairs as shown, only one input is required to the relevant transistor 20 to 23 to illuminate or deactivate each pair of lamps.

Figure 5:
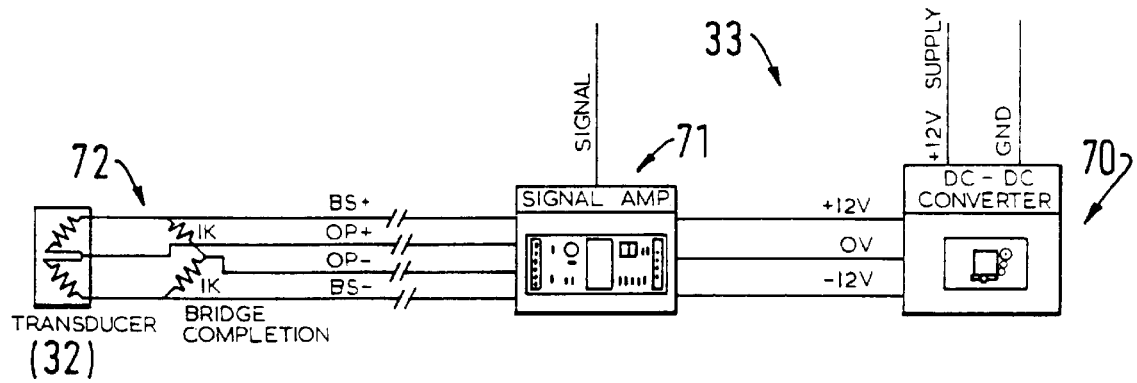
FIG. 5 shows an example of the accelerometer connections as part of the electronic circuit used to control a display system according to the invention.

The combined display effect of progressive brake warning and vehicle stationary indication are generated in this example using the circuitry shown to open and close transistors 20 to 23 between the lamps and earth. The circuit comprises a −12V DC power supply (not shown) and a regulator circuit 30 which generates a +5V output. Accelerometer unit 32 and 33 is a piezo-resistive seismic mass type accelerometer arranged in a wheatstone bridge with integral control and temperature compensation as shown in FIG. 5. This provides an output signal proportional to the acceleration (or deceleration) of the vehicle which is fed to variable resistor 52 and which signal is independent of the mechanical braking system operated by the brake pedal and therefore allows for factors such as skid. Accelerator unit 32 and 33 is driven by +12V output, which is fed to a DC-DC converter 70. The converter 70 can be a miniature encapsulated 750 mW device which provides a + and −12V supply to signal amplifier 71. The converter 70 is fully reverse polarity protected and each of the input and output rails are decoupled using electrolytic capacitors (not shown). Amplifier 71 comprises a wheatstone bridge 72 (such as that described in Radio Spares data sheet 8155 issued November 1987 for example). The amplifier 71 may be an off the shelf item or modified such that in a specific form the amplifier 71 has a gain of 250 and zero adjust from ±6.7V output. The gain and zero adjustment are set to values compatible with the accelerometer. The accelerometer 32 may be an Entran EGD-240-10 for example. The strain gauge amplifier 71 is used to raise the signal level from 10 mV/g to a level compatible with bar graph driver 36 which might be 2.5V/g in this specific example. This device as a whole has the advantages of giving a steady state (DC) response, miniature size, robustness, low cost and ease of application.

Figure 6:
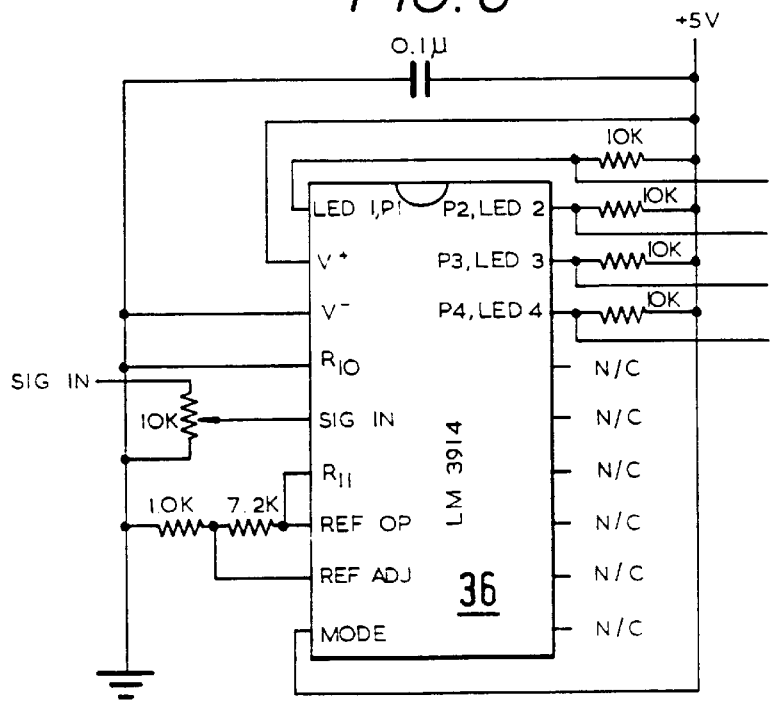
FIG. 6 shows further wiring details of the bar graph driver part of the circuit shown in FIG. 3.
Figure 7:
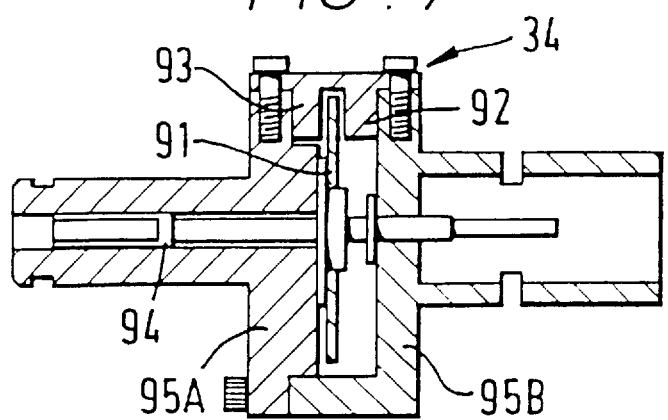
FIG. 7 shows a sectional side elevation of the speed sensor and opto-switch part of the display system according to the invention.
Figure 9A:
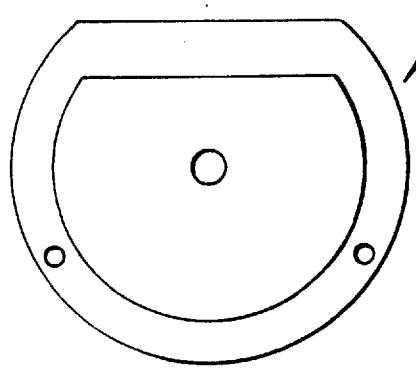
FIG. 9 parts A to H show various elevation drawings of mechanical components of the opto-switch shown in FIG. 7.
Figure 9B:
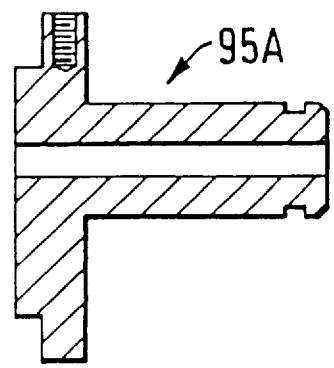
Figure 9C:
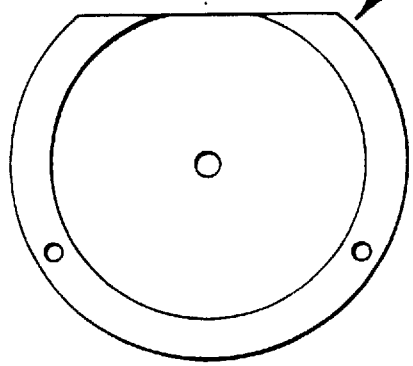
Figure 9D:
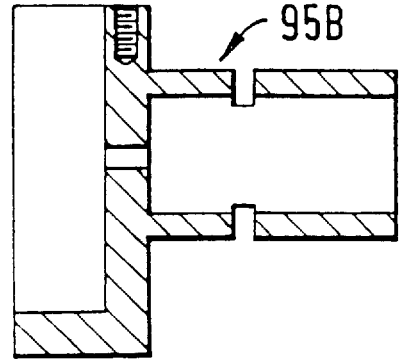

The analogue output from the accelerometer passes through a 10 kOhm variable register to a bar graph driver 36 which is a LM3914 device for example as shown in FIG. 6. Variation of the gain and offset of the output signal from amplifier 33 together with variation of potentiometer 52 can be used to alter the input voltage of driver 36 for any given vehicle deceleration. In this example the driver 36 has a linear output to input signal relationship. Thus the number of lights illuminated by the progressive brake warning system may be selected in four levels representative of vehicle deceleration of 0.05 g to 0. 2 g, 0.2 g to 0. 4 g, 0.4 g to 0.6 g, and 0.6 g and above for example.

These ranges are given by way of example and can be varied to suit the type of display used. The lowest threshold level which causes the first deceleration light to come on is preferably set to a level such that simply changing gear does not cause the light to come on but preferably should enable a signal to be generated when the driver is deliberately decelerating, albeit gently, by reducing pressure on the accelerator pedal for example. Also, the incrementation of the levels need not be even, as is approximately the case in the above example, and might vary non-linearly such as exponentially.

Power transistors 20 and 23 are caused to turn lamps 10 to 17 on by generating a high output from the relevant OR gates 40 to 43. The input to transistor 20, which controls central lamps 10 and 11, is connected to OR gate 40. The default input to OR gaze 40 is low since the +5V supply passes through a resistor and invertor 44.

The output from invertor 44 is high when driver 36 enables pin P1 to take the input to invertor 44 low. Similarly driver 36 causes a high output from invertors 45, 46 and 47 by enabling pins P2, P3 and P4 respectively. Thus, in the case of gentle deceleration detected by the accelerometer 32, driver 36 causes only P1 to generate a low input at invertor 44. A high input signal at OR gate 40 causes a high input at the input base of transistor 20 which thereby illuminates lights 10 and 11.

FIGS. 3 and 4 also show how, using device 80, a brake pedal signal can be used to illuminate central pair of lights 10 and 11 whenever the brake pedal is depressed. This might be used to indicate very slight deceleration below the preset threshold of the progressive brake warning system.

Figure 8:
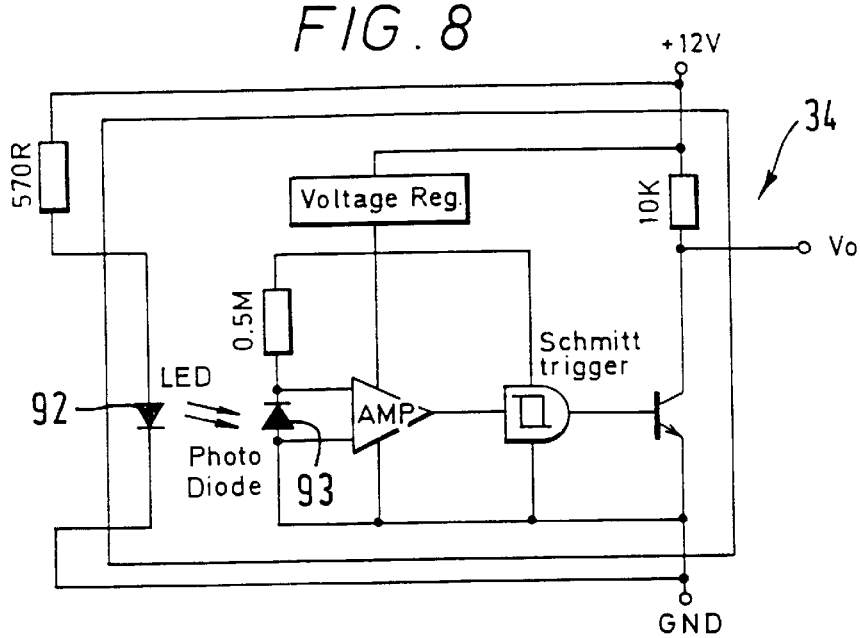
FIG. 8 gives electrical details of the opto-switch shown in FIG. 7 and connected to the circuitry shown in FIGS. 3 and 4.

The vehicle stationary indication display described with reference to FIG. 2 can be effected using opto-switch 34 and circuitry shown in FIGS. 3, 4 and 8 which make up a vehicle motion detector which measures the vehicles velocity, although for the vehicle stationary indication display it is only essential to know whether the vehicle is stationary or moving.

The information that the vehicle is stationary can be obtained using a slotted opto-sensor 34 attached to the rear of a vehicle speedometer (not shown). The speedometer drive cable spins a slotted disk 91 housed in a nylon casing 95. The slotted disk 91 is attached to a spindle 94 which is placed serially between the speedometer and cable. The opto-switch 34 comprises LED 92 and photo-diode 93. As the spindle turns, infra-red light from LED 92 is alternately obscured then allowed to fall on photo-diode 93. Integrated circuitry filters the output from photo-diode 93 to produce a clean TTL (Transistor/Transistor Logic compatible square wave, the frequency of which is proportional to vehicle speed.

The signal output from opto-switch 34 is applied to the RC (resistor/capacitor) network 100 shown in FIG. 3. When the signal is high (+12V) the small 0.1 microfarad capacitor quickly charges through the first 10 kilo-Ohm resistor. As the signal voltage the falls back to zero the current stored in the small capacitor discharges through the route of least resistance, in this case through the diode and into the relatively large 100 microF capacitor. Without a potential applied across the capacitor however the charge leaks away through the 10 kilo-Ohm resistor as it cannot pass back through the diode. Provided that the frequency of the square wave is low enough the charge in the 100 microF capacitor leaks away almost completely before being charged once more. The voltage seen by the positive terminal on the comparator 25 (such as the 339 device for example) will be virtually zero with small peaks of around 12 mV as each packet of charge is pumped through. As the frequency increases the small capacitor pumps more small amounts of charge into the large capacitor, raising the potential across it and thus the voltage at the terminal of the comparator 25. This time the frequency is such that the charge has not enough time to leak completely away through the second resistor so that the charge in the large capacitor increases with each amount of charge delivered to it. After a number of cycles the system will reach an equilibrium and a steady voltage will be present at the positive terminal of the comparator, the voltage increasing in some proportion with the vehicle speed.

The comparator 25 has a reference voltage adjusted by the voltage divider 53 applied to its negative input. When the positive terminal is below the reference voltage the output of the comparator 25 is kept high by the 5V pull up. Above the reference voltage the comparator 25 pulls its output to ground. The components in the RC network 100 and the voltage reference are adjusted so that the transition occurs at very low vehicle speed close to stationary. Thus a binary signal is available to the control system indicating 'vehicle stationary' (logic 1) or 'vehicle not stationary' (logic 0).

The mechanical components of the opto-switch device are shown in FIGS. 9 A to H. Where FIG. 9A shows an end elevation from the cable side and FIG. 9B is a sectional side elevation along axis A-A of housing part 95A. FIG. 9C shows an end elevation from the speedometer end and FIG. 9D is a sectional side elevation on axis B-B of housing part 95B. FIG. 9E shows a side elevation of spindle 94 whilst FIG. 9F is an end elevation thereof. FIG. 9G is an end elevation of slotted disk 91 and FIG. 9H a view of a clip used to complete the assembly.

The opto-switch device is given by way of example only and it is envisaged that the vehicle stationary indication display may be enabled using input data for any form of stationary detection such as from an electronic speedometer or from an anti-lock braking system (ABS). With regard to the latter it is possible to modify the present, commonly used ABS components to provide the information required by the display system in both its PBW and VSI roles. Anti-lock braking,systems typically comprise a device connected to a wheel hub which device rotates with the wheel to provide an electronic signal proportional to the rate of revolution of the wheel, for example by using an electro-magnetic inductive technique. For ABS purposes it is only required to know if the wheel locks. However, for the purposes of the present display system, greater information about the vehicle's speed is required in order for deceleration to be calculated. Therefore, modification of the ABS inductive device can be carried out to provide appropriate information, discussed later, in the device output signal.

In the VSI system described here, a square wave generator 37 triggers a counter 38 which is a 74161 device for example. Using AND gates 24a and 24b, only when the outputs from comparator 25 and oscillator 37 are high and proximity sensor 60 (described later) is low, is the clock input to counter 38 high. Whilst the vehicle is stationary the count rate is determined by oscillator 37 which can be configured to generate a specific time interval between the change of display signals shown in FIGS. 2A to D.

Counter 38 generates a binary output from 0 to 4 which is fed to multiplexor 39, which is a 74138 device for example. The multiplexor generates high and low outputs at pins M1, M2, M3 and M4 dependent on the input signal from counter 38. Pin M1, M2, M3 and M4 are connected to one input terminal of AND gazes 43, 49, 59 and 51 respectively. The other input to AND gates 48 to 51 is taken from the output of comparator 25 and proximity sensor 60 at gate 24a which is thus the output signal which enables the animate vehicle stationary indication display.

Outputs from AND gates 48 to 51 are connected to an input of OR gates 40 to 43 previously described in respect of the progressive brake warning displays. When the vehicle is stopped the input to OR gates 40 to 43 from invertors 44 to 47 will be low since there is no change in speed to generate a signal output from accelerometer 32. Thus when any of the inputs to OR gates 40 to 43 from AND gates 48 to 51 go high the relevant pair of lamps will be illuminated. The animated cyclic display described with reference to FIG. 2 is effected by the timing of oscillator 37 and the switching sequence generated by multiplexor 39. The display sequence can easily be varied by altering these components or, indeed, configuring the electrical circuit differently, for example by wiring individual lamps and not pairs of lamps.

Figure 11:
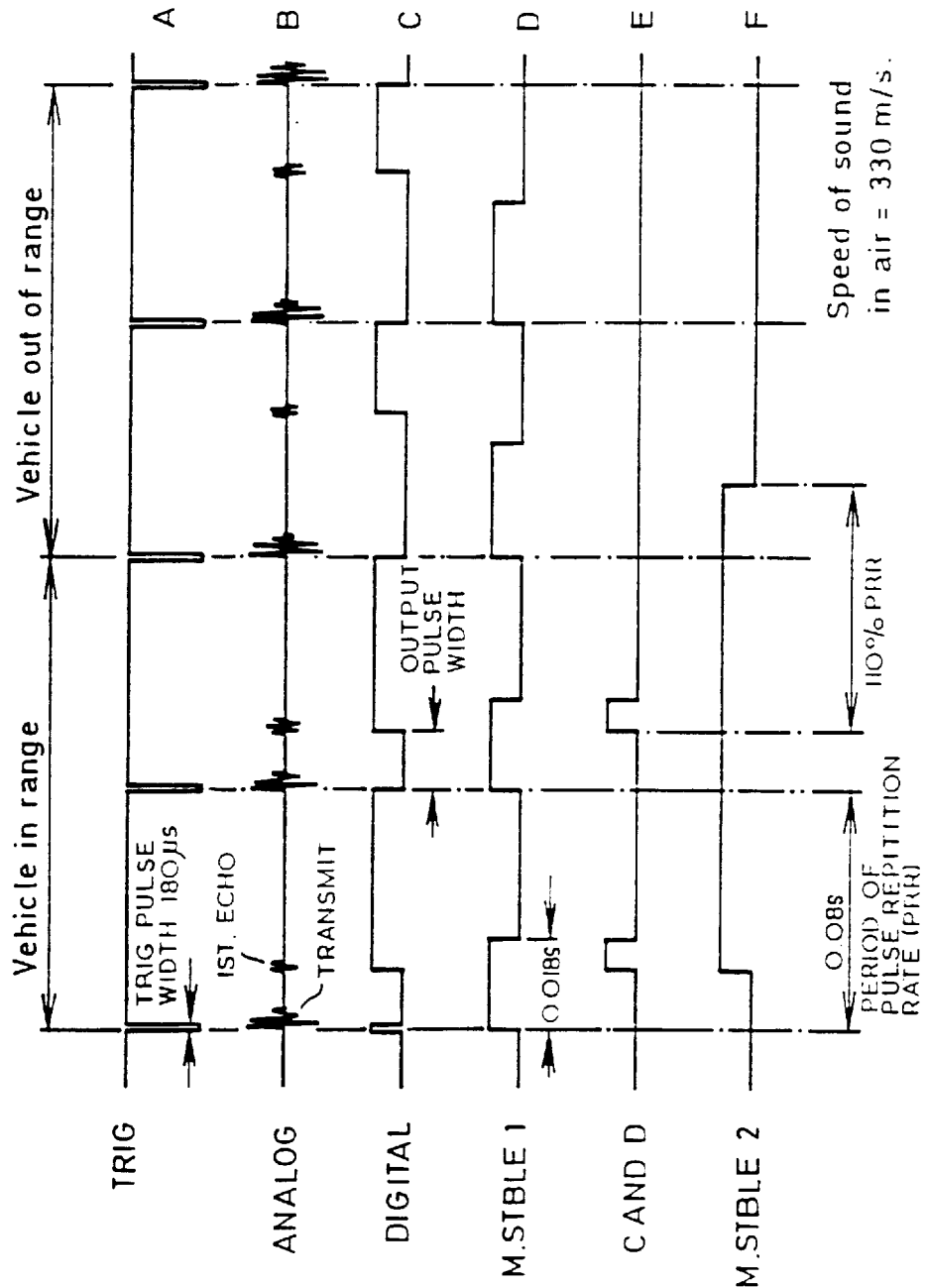
FIG. 11 shows a pulse time sequence for various component parts of the proximity sensor shown in FIGS. 3, 4, 11 and 12.
Figure 13:
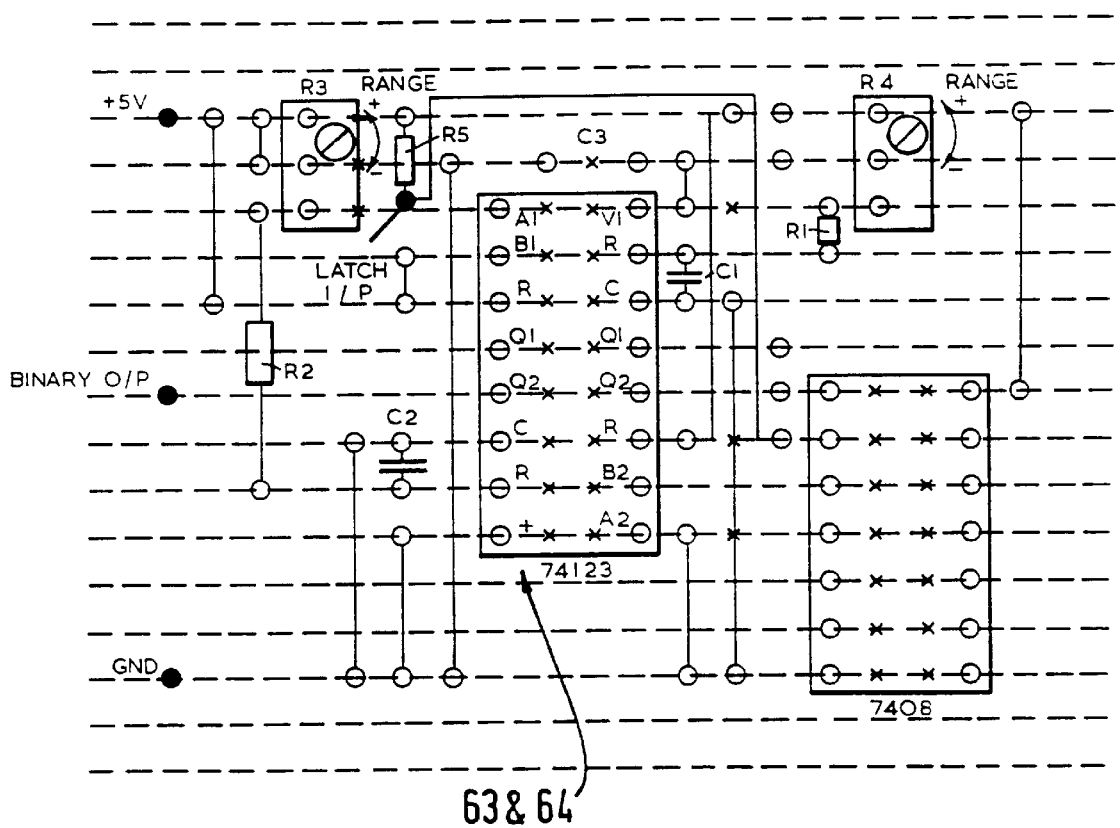
FIG. 13 shows the wiring of the monostable logic board as partly shown in FIG. 12.

The termination of the animate vehicle stationary display can be achieved in various ways such as by using proximity sensor 60 shown in FIGS. 3, 4, 10, 11 and 12 for example. A variety of devices could be used such as infra-red, optical, microwave or radar systems, however, an ultrasonic device is described here since, inter alia, it is found easy to weather-proof and has small dimensions and low cost. The ultrasonic transducer 61 can be a small (for example 25 mm) 26 kHz transducer with a maximum range of 9 m when used with a small directional horn, for example. The proximity sensor 60 includes a remote ranging module 62 which drives the transducer 61 and filters the output from it. Module 62 provides a digital latch output labelled C in FIG. 11. As the transducer is triggered the latch is switched low. It stays low until the first echo is received whereby it switches high. It remains high until triggered low again by the start of the next trigger pulse (A in FIG. 11). If the object is out of range of the sensor 60 (greater than 9 m in this example) then the latch is not switched high by the returning echo. In which case the trigger switches the latch high momentarily then back low the pulse width being similar to that of the trigger at approximately 180 microseconds say, as shown in FIG. 11. The duration of the low pulse from the latch provides a means to calculate the distance of an object, in this case a trailing vehicle.

Figure 12:
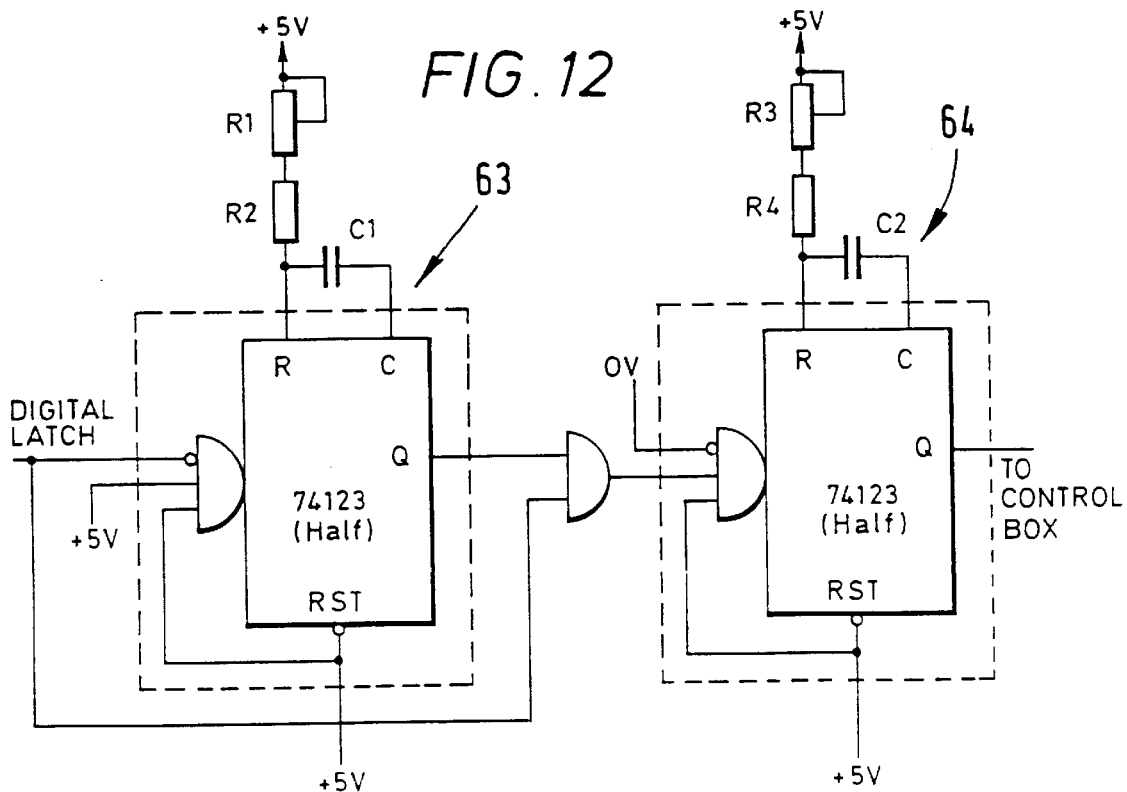
FIG. 12 shows wiring to two monostable devices part of the proximity sensor device shown as part of FIGS. 3 and 4.

The digital latch signal is used to set a monostable device 63, such as a 74123 dual resettable for example, running high. The latch output is tied to +5V as a logic high state and when it is switched hard on by the module 62 the latch output is pulled to ground, logic low; otherwise the output is logic high. Thus the latch output is compatible with 5V TTL logic in the control box 3. The total output is applied to the 'A' input of first monostable 63 as shown in FIG. 12. Each time the transducer is triggered the falling edge of the latch sets the monostable high as shown in trace D of FIG. 11. The monostable timing circuit is calibrated such that it resets the monostable 63 after a period of 0.018 s which corresponds to a range of approximately 3 m from the transducer. That is a total of 6 m travelled by sound at 330 m/s. The period of the pulse repitition rate PRR is set at 0.06 s (ie greater than the time equivalent of the length of sound travel path) in this example. Monostable 63 may be a DM74LS123 device for example where delay Tw=0.37 CxRx such that for C1=10 microfarads and R1=10 kilo-Ohm variable and R2=2.2 kilo-Ohm as shown in FIG. 12, Tw=0.008 to 0.0452 s giving a range of 1.34 to 7.45 meters. Selection of delay Tw=0.018 s is therefore only given as an example for vehicle detection up to approximately 3 meters from transducer 61.

The digital latch output from module 62 and the output from monostable 63 are coupled using a logic AND gate. The output of this gate thus gives a logic high state if a car is detected within the specified range, three meters in this example as shown in trace E of FIG. 11. This pulse signal is fed to the 'B' input of a second monostable device 64, again a 74123 device for example. The delay period of device 64 is set to correspond to approximately 110% of the period of PRR.

Thus, as long as a car is within range (3 m in this example the output of the second monostable 64 remains high. If the following vehicle moves out of range then monostable 64 is not reactivated and falls back low after 0.066 s (110% PRR period) and remains low until a vehicle is again detected in range. Thus, a binary signal is output from proximity sensor 60 indicating vehicles less than 3 m behind (logic high) or, vehicle or vehicles greater than 3 m behind (logic low). This is shown as trace F in FIG. 11.

The output from proximity sensor 60 is inverted and fed to AND gate 24*a* which also has as input the output from comparator 25. If the vehicle is stopped and there is no vehicle within the range of sensor 60 then both inputs to gate 24*a* will be high and the animate display is enabled as previously described.

The output from proximity sensor 60 is also fed to AND gate 24C to which is also applied the output from comparator 25. If the vehicle is stationary and there is a vehicle within the set range then both inputs to AND gate 24C will be high and outer pair of lights 16 and 17 will be illuminated until such time as the vehicle behind moves out of range, or as is apparently more likely, the vehicle with the display system 1 starts to move in which case the vehicle stationary indicator is deactivated entirely.

It is also envisaged that whilst an accelerometer 32 and opto-switch 34 are used in this example it is possible to make use of a vehicle's anti-lock brake system (ABS) and the wheel speed sensors therein in a display system according to the invention. It is possible to continuously measure the speed of a vehicle from this source (or indeed any independent vehicle velocity measuring device) and thereby calculate acceleration using a time reference. It would then be possible to use this source to drive the logic circuit just described to illuminate and deactivate lamps 10 to 17 in accordance with the sequence described with respect to FIGS. 1 and 2. This technique has the benefit that it substantially uses a system already fitted to generate relevant vehicle data independent of the actual braking system itself. It may therefore be readily incorporated during manufacture and has the advantage of reducing the cost of the display system itself. However, as previously described some modification of currently available ABS devices may be required in order specifically to enhance the signal generated using such a device. In particular it may be necessary to increase the sampling rate of the ABS device in order to provide a signal of sufficient variability to enable preset ranges of deceleration/acceleration to be distinguished. In a preferred form the present display system would derive input data from ABS devices attached to diagonally opposite wheels on a vehicle Additionally, the ABS device and a time reference system as just described could be used to provide a signal to a display which is indicative of the vehicle travelling at constant speed or accelerating. The display for the latter might comprise an array of green lights for example the number of which that are activated depending on the magnitude of acceleration.

It is also envisaged that a display indicator for presenting a PBW or VSI signal to a driver may be fitted in vehicles to be visible to the driver of that vehicle, where the display indicator is responsive to a vehicle motion detection means or a vehicle deceleration detection means in another vehicle. Thus a display indicator in a trailing vehicle might receive a radio signal from a leading vehicle which radio signal contains information about the state of motion of the leading vehicle.

The display indicator would therefore comprise a radio receiver and means either to distinguish the signal from the immediately leading vehicle when presented with several signals from several leading vehicles or to terminate the display in order not to present erroneous information to a driver in such circumstances of several signals being received by the radio receiver.

We claim:

1. A method of indicating the state of motion of a subject vehicle to a driver of a following vehicle by means of an array of lamps mounted on the subject vehicle and operable to produce a visual display indicative of the state of motion, the method comprising the steps of sensing a measure of velocity of the subject vehicle by operation of a vehicle motion measuring means, determining whether the measure of velocity is less than a reference value and, when so determined, illuminating said lamps in a time dependent sequence to produce an animated visual display indicative of the state of motion as being stationary, and determining by operation of a vehicle distance measuring device mounted on the subject vehicle whether said following vehicle is within a pre-set distance behind said subject vehicle and, when so determined, discontinuing said time dependent sequence and illuminating said lamps thereafter in a time independent manner to produce a static visual display indicative of the state of motion as being stationary.

2. A method as claimed in claim 1 wherein the lamps are mounted in a row extending transversely of the subject vehicle, the row comprising a central portion and left end right end portions, and wherein the animated visual display is provided by illuminating the lamps and sequentially de-actuating selected pairs of lamps to create a pattern cyclically moving symmetrically outwardly from said central portion of the row to both said left and right end portions of the row.

3. A method as claimed in claim 2 wherein the static visual display is provided by continuously illuminating a selected pair of lamps at said left and right end portions of the row.

4. A method as claimed in claim 2 wherein the central portion includes at least one brake actuated lamp which is illuminated solely in response to actuation of the brakes of the subject vehicle.

5. A method as claimed in claim 1 wherein both the animated visual display and the static visual display indicative of the state of motion as being stationary are produced independently of whether the brakes of the subject vehicle are actuated.

6. A method as claimed in claim 1 wherein the vehicle motion measuring means comprises a wheel speed sensor of an anti-lock brake system (ABS) of the subject vehicle.

7. A method as claimed in claim 1 including the step of determining whether the measure of velocity is greater than said reference value and, when so determined, determining whether the brakes of the subject vehicle are actuated and, if so determined, illuminating said lamps to produce a deceleration indicating visual display indicative of the magnitude of deceleration of the subject vehicle.

8. A method as claimed in claim 7 including the step of sending a measure of deceleration of the subject vehicle by operation of a deceleration detection means, comparing the measure of deceleration with a plurality of predetermined range limits defining a plurality of ranges of deceleration to determine a measured range of deceleration, and illuminating a number of pairs of lamps representative of the measured range of deceleration such that the number of lamps so illuminated increases with increasing deceleration.

9. A method as claimed in claim 8 wherein said deceleration detection means comprises a timing device and is operable to determine the magnitude of deceleration by determining the rate of change of the measure of velocity.

10. A method as claimed in claim 8 comprising four ranges of deceleration, each range being associated with a respective paid of the lamps, whereby up to a maximum of four pairs of lamps representative of the measured range of deceleration are illuminated.

11. A motor vehicle display system for indicating the state of motion of a subject vehicle to a driver of a following vehicle, the system comprising an array of lamps mounted in use on the subject vehicle and operable to produce a visual display indicative of the state of motion;

a vehicle motion measuring means operable to sense a measure of velocity of the subject vehicle;

means for comparing the measure of velocity with a reference value;

means for illuminating said lamps in a time dependent sequence in response to said measure of velocity being determined to be less than said reference value, whereby the sequence produces an animated visual display indicative of the state of motion as being stationary;

a vehicle distance measuring device mounted in use on the subject vehicle and operable to determine whether said following vehicle is within a pre-set distance behind said subject vehicle; and wherein the means for illuminating said lamps is operatively connected to said vehicle distance measuring device such that, when said following vehicle is determined to be within said pre-set distance, the time dependent sequence is discontinued and said lamps are illuminated thereafter in a time independent manner to produce a static visual display indicative of the state of motion as being stationary.

12. A motor vehicle display system as claimed in claim 11 wherein said array of lamps comprises a row of lamps extending transversely of the subject vehicle, the row comprising a central portion and left and right end portions, and wherein the central portion comprises at least one brake actuated lamp which is illuminated solely in response to actuation of the brakes of the subject vehicle.

13. A motor vehicle display system as claimed in claim 11 comprising a deceleration detecting means operable to determine a measure of deceleration of the subject vehicle and wherein said means for illuminating said lamps is operable, when the measure of velocity is determined to be greater then the reference value, to illuminate said lamps to produce a deceleration indicating visual display indicative of the magnitude of deceleration of the subject vehicle.

14. A motor vehicle display system as claimed in claim 13 wherein the deceleration detection means comprises a timing device and is operable to determine the magnitude of deceleration by determining the rate of change of the measure of velocity.

15. A motor vehicle display system as claimed in claim 14 comprising means for comparing the measure of deceleration with a plurality of predetermined range limits defining a plurality of ranges of deceleration to thereby determine a measured range of deceleration, and wherein the means for illuminating said lamps is operable to illuminate a number of pairs of said lamps representative of the measured range of deceleration such that the number of lamps so illuminated increases with increasing deceleration.

16. A motor vehicle display system as claimed in claim 15 wherein the number of ranges of deceleration is four and wherein the array of lamps comprises four pairs of lamps, each pair of lamps being symmetrically located relative to a central brake actuated lamp which is illuminated solely in response to actuation of the brakes of the subject vehicle.

* * * * *